United States Patent
Aulisio et al.

(10) Patent No.: US 8,653,693 B2
(45) Date of Patent: Feb. 18, 2014

(54) INTEGRATED EXCITER-IGNITER

(75) Inventors: Michael Vincent Aulisio, North Ridgeville, OH (US); Greg Scott Tollis, Medina, OH (US); Elmer L. Griebeler, Chesterland, OH (US); Neil D. Rowe, North Olmsted, OH (US)

(73) Assignee: Alphaport, Inc., Cleveland, OH (US)

( * ) Notice: Subject to any disclaimer, the term of this patent is extended or adjusted under 35 U.S.C. 154(b) by 375 days.

(21) Appl. No.: 13/014,849

(22) Filed: Jan. 27, 2011

(65) Prior Publication Data
US 2011/0181997 A1 Jul. 28, 2011

Related U.S. Application Data

(60) Provisional application No. 61/298,646, filed on Jan. 27, 2010.

(51) Int. Cl.
*H02J 7/00* (2006.01)

(52) U.S. Cl.
USPC ........... 307/63; 307/109; 307/10.6; 307/10.3; 307/143; 361/256; 361/257; 361/253; 361/263; 361/247; 439/364; 439/874; 123/603; 123/169; 123/647; 123/643; 123/630; 327/440; 327/438; 327/365; 327/443; 327/460; 339/17; 339/177; 60/39.827; 60/39.821; 60/776

(58) Field of Classification Search
USPC ................. 361/287, 256, 257, 253, 263, 251; 307/67; 315/209; 327/440
See application file for complete search history.

(56) References Cited

U.S. PATENT DOCUMENTS

| | | | | |
|---|---|---|---|---|
| 4,506,939 A | * | 3/1985 | Faulkenberry et al. | 439/63 |
| 4,690,480 A | * | 9/1987 | Snow et al. | 439/364 |
| 5,381,773 A | * | 1/1995 | Straub | 123/643 |
| 5,473,502 A | * | 12/1995 | Bonavia et al. | 361/256 |
| 5,592,118 A | * | 1/1997 | Wilmot et al. | 327/440 |
| 5,654,868 A | * | 8/1997 | Buer | 361/256 |
| 8,046,987 B2 | * | 11/2011 | Wilmot et al. | 60/39.827 |

* cited by examiner

*Primary Examiner* — Rexford Barnie
*Assistant Examiner* — Jagdeep Dhillon
(74) *Attorney, Agent, or Firm* — Buckingham, Doolittle & Burroughs, LLC (57) ABSTRACT

An integrated exciter-igniter architecture is disclosed that integrates compact, direct-mounted exciter electronics with an aerospace designed igniter to reduce overall ignition system complexity. The integrated exciter-igniter unit hermetically seals exciter electronics within a stainless steel enclosure or housing. The stainless enclosure enables the exciter electronics to remain near atmospheric pressure while the unit is exposed to vacuum conditions. The exciter electronics include a DC-DC converter, timing circuitry, custom-designed PCBs, a custom-designed main power transformer, and a high voltage ignition coil. All of which are packaged together in the stainless steel enclosure. The integrated exciter-igniter unit allows for efficient energy delivery to the spark gap and eliminates the need for a high voltage cable to distribute the high voltage, high energy pulses.

15 Claims, 8 Drawing Sheets

INTEGRATED EXCITER-IGNITER

CROSS-REFERENCE

This application claims priority from Provisional Patent Application Ser. No. 61/298,646 filed Jan. 27, 2010.

BACKGROUND

Various conventional ignition systems have been used for ignition of a propellant mixture in jet or rocket propulsion applications. These systems have electronics separated from the igniter by a high voltage (HV) cable that can be as long as four feet. Such a distribution cable requires high voltage insulation, and can often times be a source for system failure.

Accordingly, there is a need for an integrated exciter-igniter unit. Such an assembly interfaces exciter electronics directly to the igniter, thereby eliminating the need for an HV cable and increasing system reliability. Potential applications exist for this type of ignition system, including those employing gaseous oxygen-methane (GOX-methane) and liquid oxygen-methane (LOX-methane) propellants. Integrated exciter-igniter systems could be used in a number of government developed and commercial aerospace applications.

SUMMARY

The following is a summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description.

An exciter-igniter architecture is disclosed that integrates exciter electronics with an igniter. The exciter-igniter unit features exciter electronics within a hermetically sealed stainless steel enclosure with a direct mounted aerospace designed igniter. The unit efficiently transforms a direct current (DC) input voltage into a high-voltage, high-energy pulse train for igniting a given propellant. A miniaturized custom designed ignition coil is housed within the hermetic enclosure, and directly interfaces to the igniter. The unit mates to an external electrical system via a hermetic connector. The unit provides a fixed frequency spark rate with controlled spark energies. The exciter-igniter unit is designed to The National Aeronautics and Space Administration (NASA) supplied specifications, based upon potential flight performance requirements for space operation.

The exciter electronics assembly is comprised of three fundamental boards: an input connector board, a DC-DC converter board, and a HV exciter board. The input connector board provides an interface between the hermetic connector and the exciter electronics. This board also generates key timing signals. The DC-DC converter board is responsible for regulating the energy storage voltage, which is responsible for delivering the bulk of the spark energy pulse. The HV exciter board is located at the bottom of the board stack. It generates the high voltage spark, sends a scaled signal of the spark current to the input connector board, provides a mounting location for the ignition coil, and most importantly eliminates the need for a high voltage cable by interconnecting the igniter and the coil.

Further, the direct mounted aerospace designed igniter is positioned at one end of the stainless steel enclosure. The igniter has a unique tip that conducts the spark energy to ignite the propellant. The integrated exciter-igniter unit allows for efficient energy transfer to the spark gap.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

In jet and rocket propulsion systems, numerous exciter-igniter systems have been employed. Many of these systems have electronics separated from the igniter by an HV cable that can be as long as four feet. Such a distribution cable requires high voltage insulation, and can often times be a source for system failure.

As such, an exciter-igniter system has been designed that eliminates the need for an HV cable. Eliminating an HV cable assembly increases system reliability, and also increases overall system efficiency. Furthermore, the unit utilizes a stainless steel hermetic enclosure, enabling operation in vacuum environments. The unit efficiently transfers energy to a given spark gap. The unit is compact in nature. The unit provides a fixed frequency spark rate with controlled spark energies. The exciter-igniter unit is designed to NASA supplied specifications, based upon potential flight performance requirements for space operation.

The exciter-igniter assembly is comprised of a stainless steel enclosure, a hermetic connector, an aerospace designed igniter, and an exciter electronics sub-assembly. The exciter electronics sub-assembly is made up of three fundamental boards: an input connector board, a DC-DC converter board, and an HV Exciter board. The input connector board provides an interface between the system connector and the exciter electronics. This board generates key timing signals and distributes them to boards that are located downstream. The DC-DC converter board regulates the energy storage voltage, which is responsible for delivering the bulk of the spark energy pulse. This board further distributes timing signals and power. The HV exciter board is located at the bottom of the board stack. It generates the high voltage spark, sends a scaled signal of the spark current to the input connector board, provides a mounting location for the ignition coil, and most importantly eliminates the need for a high voltage cable by interconnecting the igniter and the coil.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
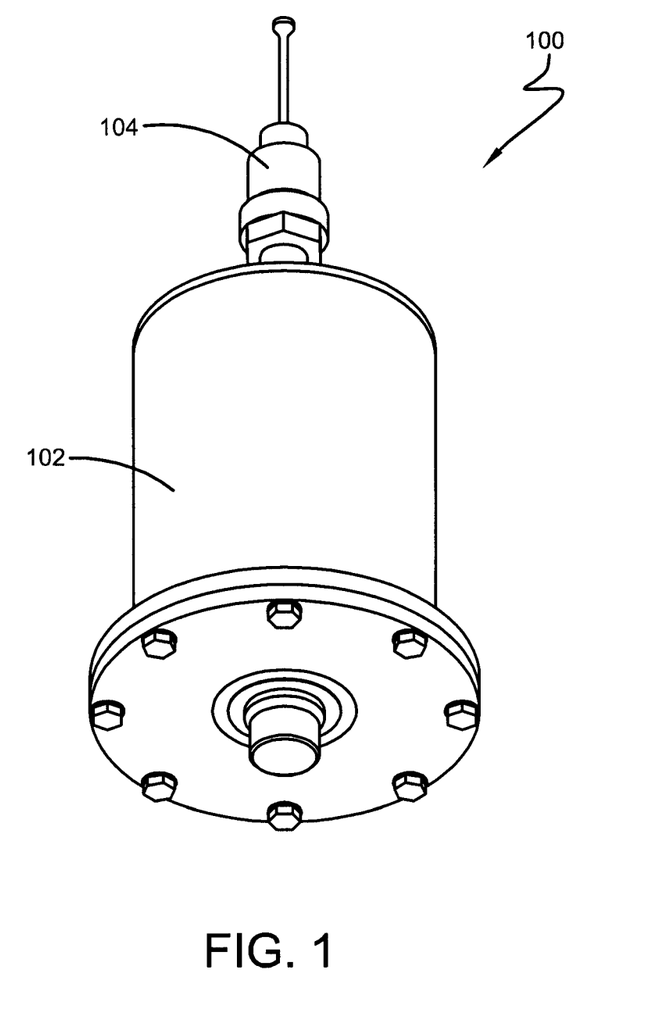
FIG. 1 illustrates a perspective view of the flight-like exciter-igniter in accordance with the disclosed architecture.

FIG. 1 illustrates the flight-like, integrated exciter-igniter unit 100 in accordance with the disclosed architecture. The unit 100 comprises a housing 102 and an igniter 104. The exciter-igniter unit 100 integrates exciter electronics (not shown) with an igniter 104. The exciter-igniter unit 100 comprises the exciter electronics within a hermetically sealed stainless steel enclosure or housing 102 with a direct mounted aerospace designed igniter 104. The unit 100 efficiently transforms a DC input voltage into a high-voltage, high-energy pulse train for igniting a given propellant. A miniaturized custom designed ignition coil (not shown) is housed within the hermetic enclosure 102, and directly interfaces to the igniter 104. The unit 100 mates to an external electrical system via a hermetic connector (not shown). The unit 100 provides a fixed frequency spark rate with controlled spark energies. The exciter-igniter unit 100 is designed to NASA supplied specifications, based upon potential flight performance requirements for space operation.

Figure 2:
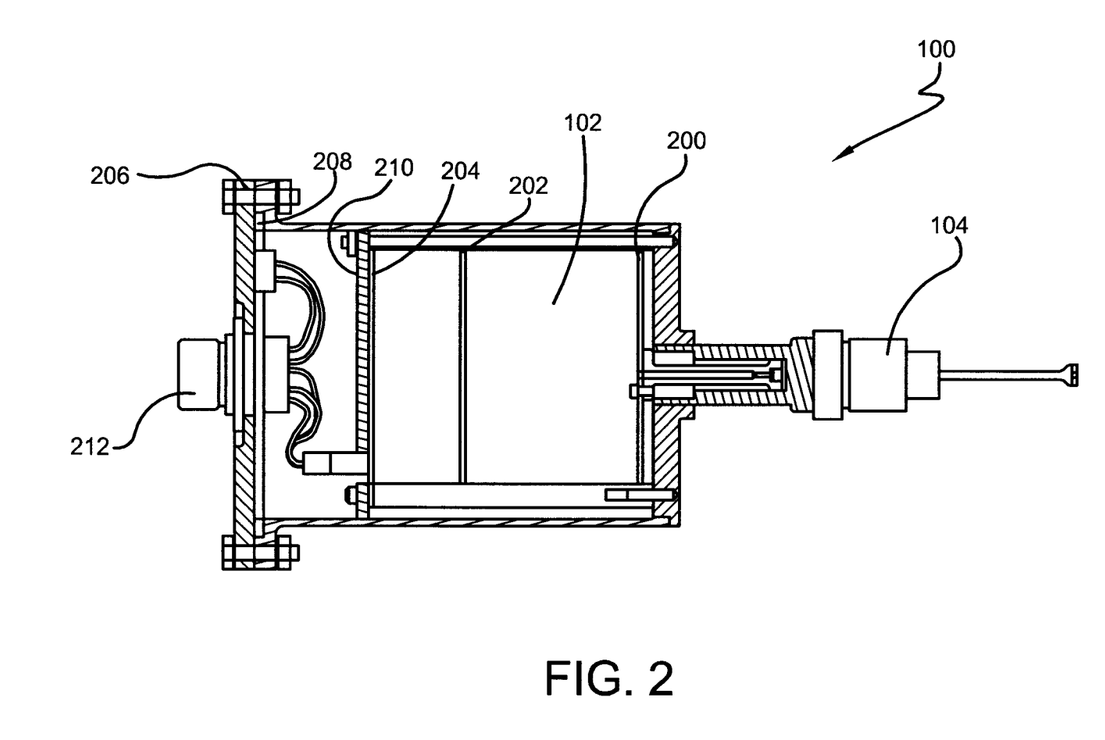
FIG. 2 illustrates a perspective view of the integrated exciter-igniter in accordance with the disclosed architecture.

FIG. 2 illustrates the exciter-igniter unit 100, and all of the major components of which the unit is comprised. The unit 100 comprises a housing 102 and an igniter 104. The exciter-igniter unit 100 integrates exciter electronics with the igniter 104. The exciter electronics comprise a DC-DC converter, timing circuitry, custom-designed printed circuit boards (PCBs), a custom-designed main power transformer, and a high voltage ignition coil. All of which are packaged together in the stainless steel housing 102. Further, the PCBs of the exciter electronics assembly include three fundamental boards, an HV exciter board 200, a DC-DC converter board 202, and an input connector board 204.

The HV exciter board 200 is located at the bottom of the board stack. It generates the high voltage spark, sends a scaled signal of the spark current to the input connector board, provides a mounting location for the ignition coil, and most importantly eliminates the need for a high voltage cable by interconnecting the igniter and the coil. Specifically, a high voltage pin (not shown) interfaces the aerospace designed igniter to the HV exciter board and its associated ignition coil. The high voltage pin is custom designed. The DC-DC converter board 202 is responsible for regulating the energy storage voltage, which is responsible for delivering the bulk of the spark energy pulse. The input connector board 204 provides an interface between the hermetic connector 212 and the exciter electronics. This board also generates key timing signals.

Further components of the housing 102 comprise a stainless steel flange 206, a copper seal 208 and a mechanical support ring 210. The hermetic connector 212 is mounted to the stainless steel flange 206. The copper seal 208 is paramount to maintaining internal atmospheric pressure while the unit 100 is being exposed to a vacuum. The copper seal 208 is partially crushed between the forward housing 102 and flange 206 upon assembly of the unit 100 to achieve the level of sealing needed for operations. For final sealing, the unit 100 would ultimately be welded together and the copper seal 208 would then be omitted. The mechanical support ring 210 is necessary as it is responsible for fastening the exciter electronics to the stainless steel housing 102.

Figure 3:
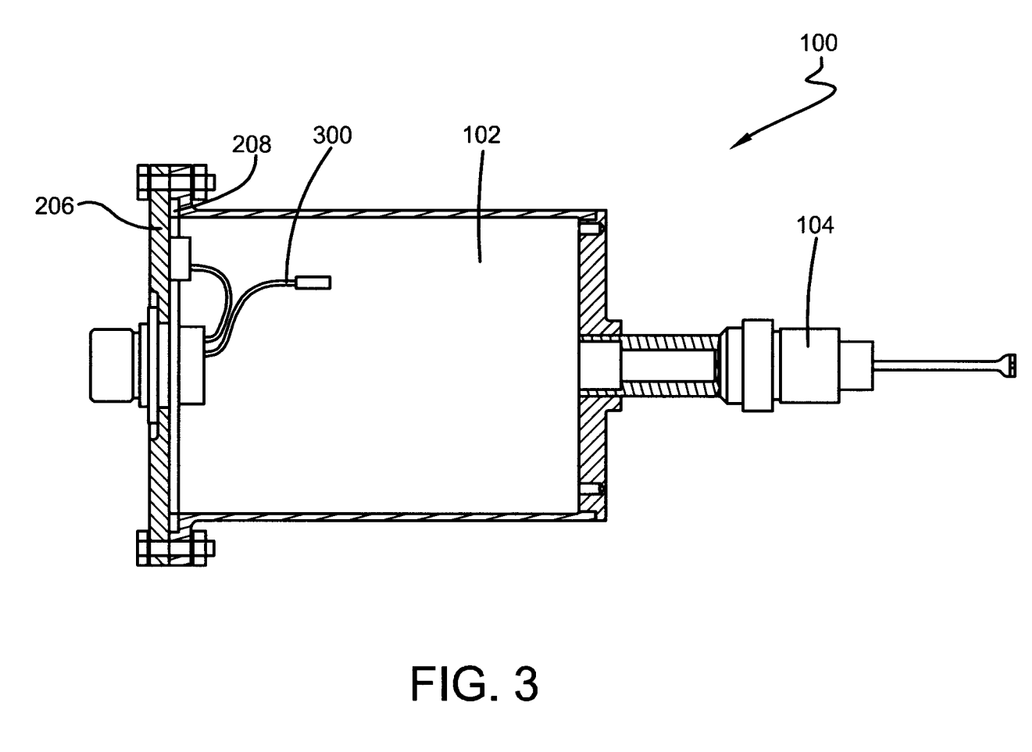
FIG. 3 illustrates a perspective view of the housing assembly of the exciter-igniter in accordance with the disclosed architecture.

FIG. 3 illustrates a hermetically sealed stainless steel housing 102 of the exciter-igniter unit 100. The exciter-igniter unit 100 integrates exciter electronics (not shown) with an igniter 104. The exciter-igniter unit 100 comprises the exciter electronics within a hermetically sealed stainless steel enclosure or housing 102 with a direct mounted aerospace designed igniter 104. The unit 100 efficiently transforms a DC input voltage into a high-voltage, high-energy pulse train for igniting a given propellant. A miniaturized custom designed ignition coil 300 is housed within the hermetic enclosure 102, and directly interfaces to the igniter 104. The HV ignition coil 300 is a custom designed compact ignition coil. The coil features a Microsil® core. A custom bobbin was machined to facilitate winding of the coil. Also used in the design is quad build magnet wire, and an insulation method using epoxy potting compound and muslin cloth.

The unit 100 mates to an external electrical system via a hermetic connector 212. The hermetic connector 212 can be any suitable hermetic connector known in the art. The hermetic connector 212 is mounted to the stainless steel flange 206. Further, the copper seal 208 is used to maintain internal atmospheric pressure while the unit 100 is being exposed to a vacuum. The copper seal 208 is partially crushed between the forward housing 102 and flange 206 upon assembly of the unit 100 to achieve the level of sealing needed for operations. For final sealing, the unit 100 would ultimately be welded together and the copper seal 208 would then be omitted. The unit 100 provides a fixed frequency spark rate with controlled spark energies.

Figure 4:
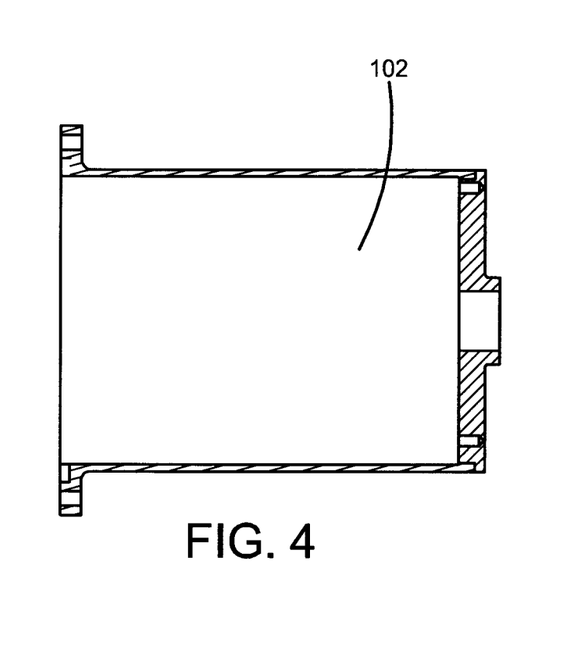
FIG. 4 illustrates a perspective view of the housing of the exciter-igniter in accordance with the disclosed architecture.

FIG. 4 illustrates the stainless steel forward housing 102 of the exciter-igniter unit. The housing 102 provides a means to mount both the exciter electronics assembly and igniter on one piece of hardware. The housing 102 is typically stainless steel but could be made of any other suitable materials known in the art. The housing 102 is also hermetically sealed thereby maintaining internal atmospheric pressure while the exciter-igniter unit is being exposed to a vacuum. The exciter-igniter unit comprises the exciter electronics assembly within the hermetically sealed stainless steel housing 102 with a direct mounted aerospace designed igniter (not shown). Accordingly, the exciter-igniter unit efficiently transforms a DC input voltage into a high-voltage, high-energy pulse train for igniting a given propellant.

Figure 5:
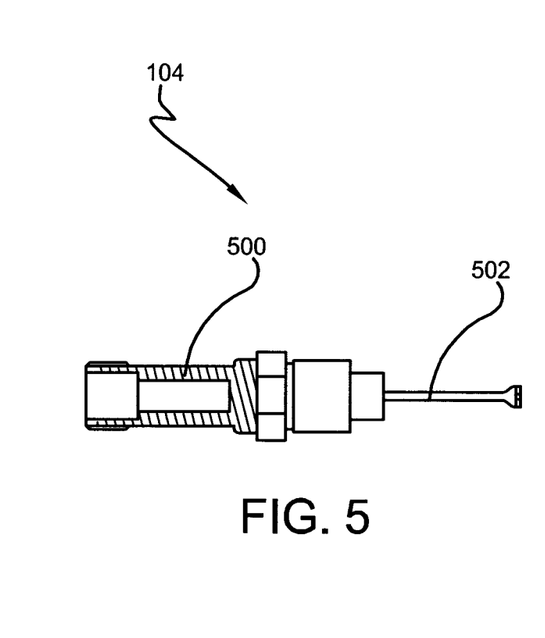
FIG. 5 illustrates a perspective view of the modified spark plug of the exciter-igniter in accordance with the disclosed architecture.

FIG. 5 illustrates the igniter 104 of the exciter-igniter unit. The igniter 104 comprises a modified spark plug 500 and a custom tip 502 laser welded to the plug. The spark plug illustrated is a Champion Aerospace® spark plug, but any other suitable spark plug could be used as is known in the art. The tip was custom designed specifically for the exciter-igniter unit. The tip material is typically Inconel® 600 but could be any other suitable material known in the art. This alloy is used in high temperature applications, and is corrosion and oxidation resistant. The geometry of the tip was determined such that a radial gap of 0.025 inches was achieved with the given physical area in which to work.

Figure 6:
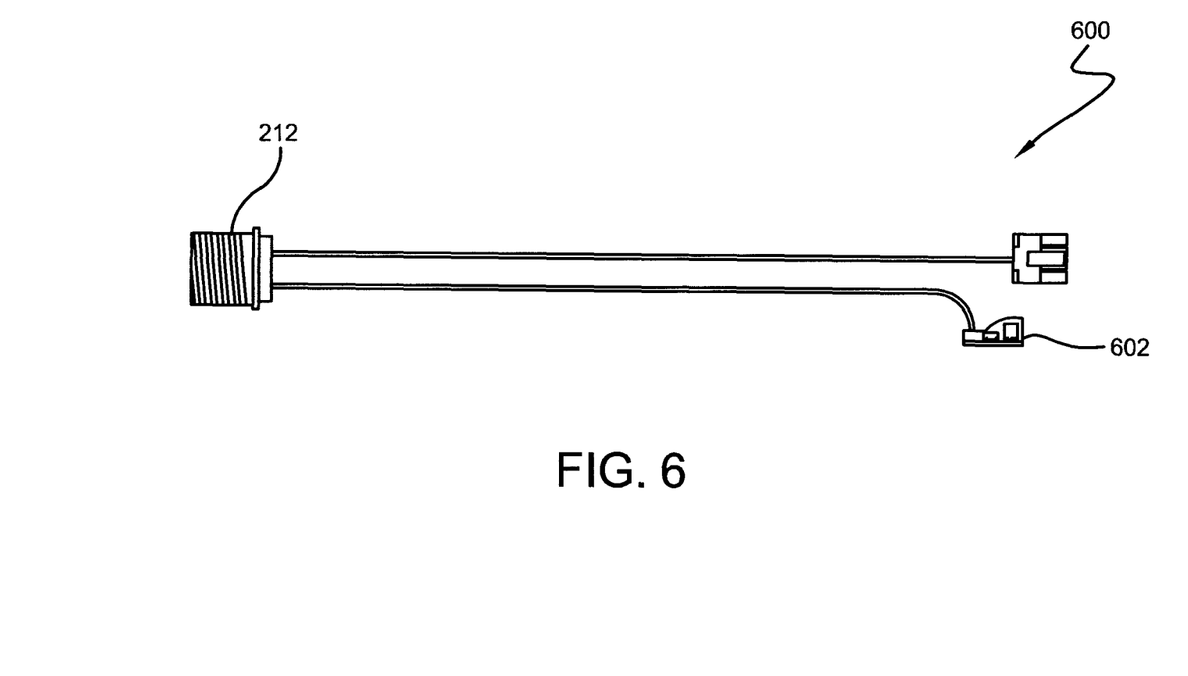
FIG. 6 illustrates a perspective view of the hermetic connector harness of the exciter-igniter in accordance with the disclosed architecture.

FIG. 6 illustrates the hermetic connector harness 600 of the exciter-igniter unit. The harness 600 interfaces from the input cable harness to the electronics assembly stack via the hermetic connector 212. Additionally, a pressure sensor assembly 602 is depicted. The pressure sensor assembly 602 was used solely for bench top testing and verification of internal atmospheric testing.

Figure 7:
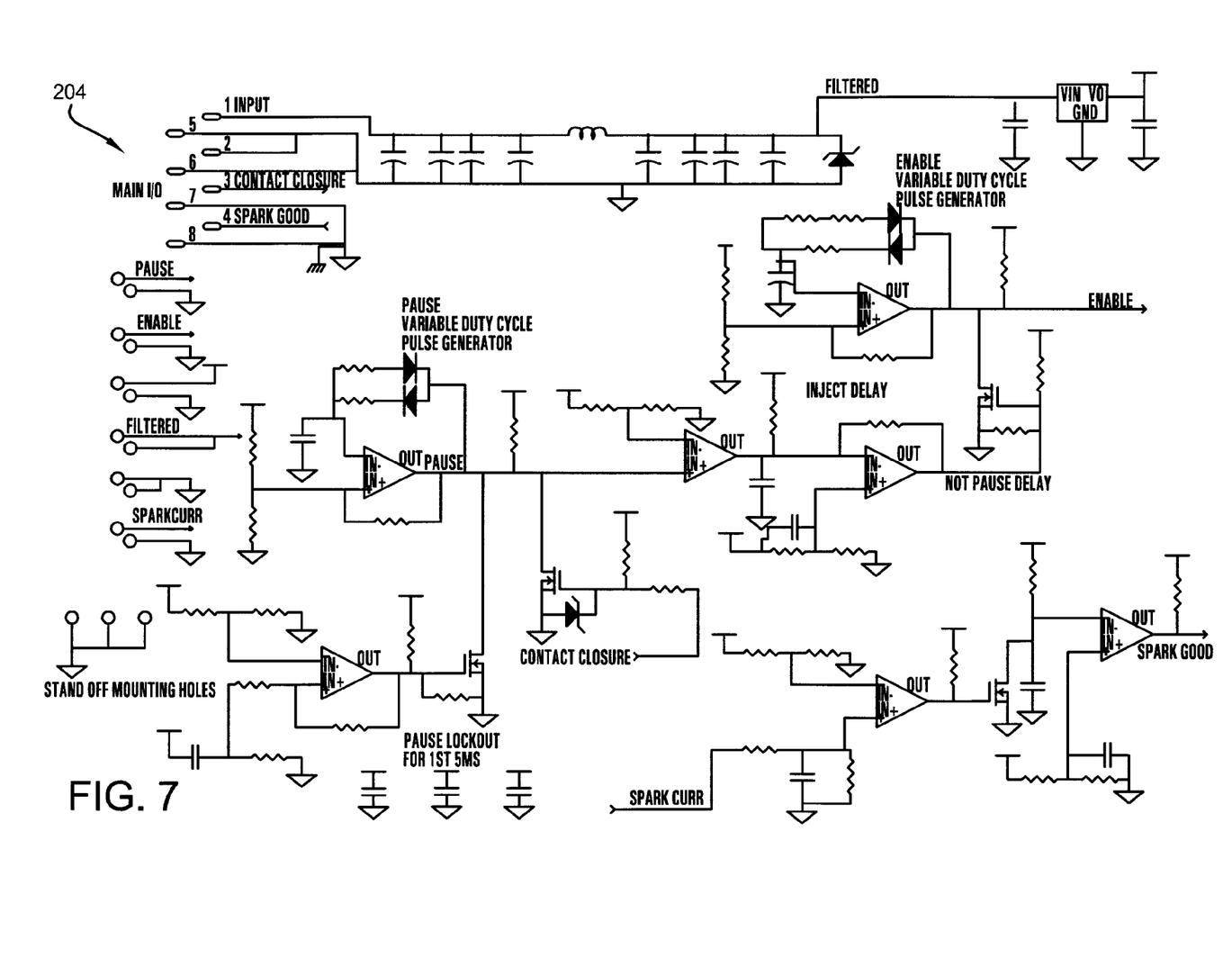
FIG. 7 illustrates the input connector board schematic of the exciter-igniter in accordance with the disclosed architecture.

FIG. 7 illustrates the input connector board 204 schematic. The input connector board is the first board in the electronics stack as it provides an interface between the hermetic connector and the exciter electronics. The PCB filters the raw input, and passes it downstream. The board generates key timing signals that are utilized by the other two boards in the stack. The board also contains 12V housekeeping circuitry, which again is used by the other PCBs. Lastly, the board receives a scaled version of the spark current, and then produces a health diagnostic "spark good" signal.

Figure 8:
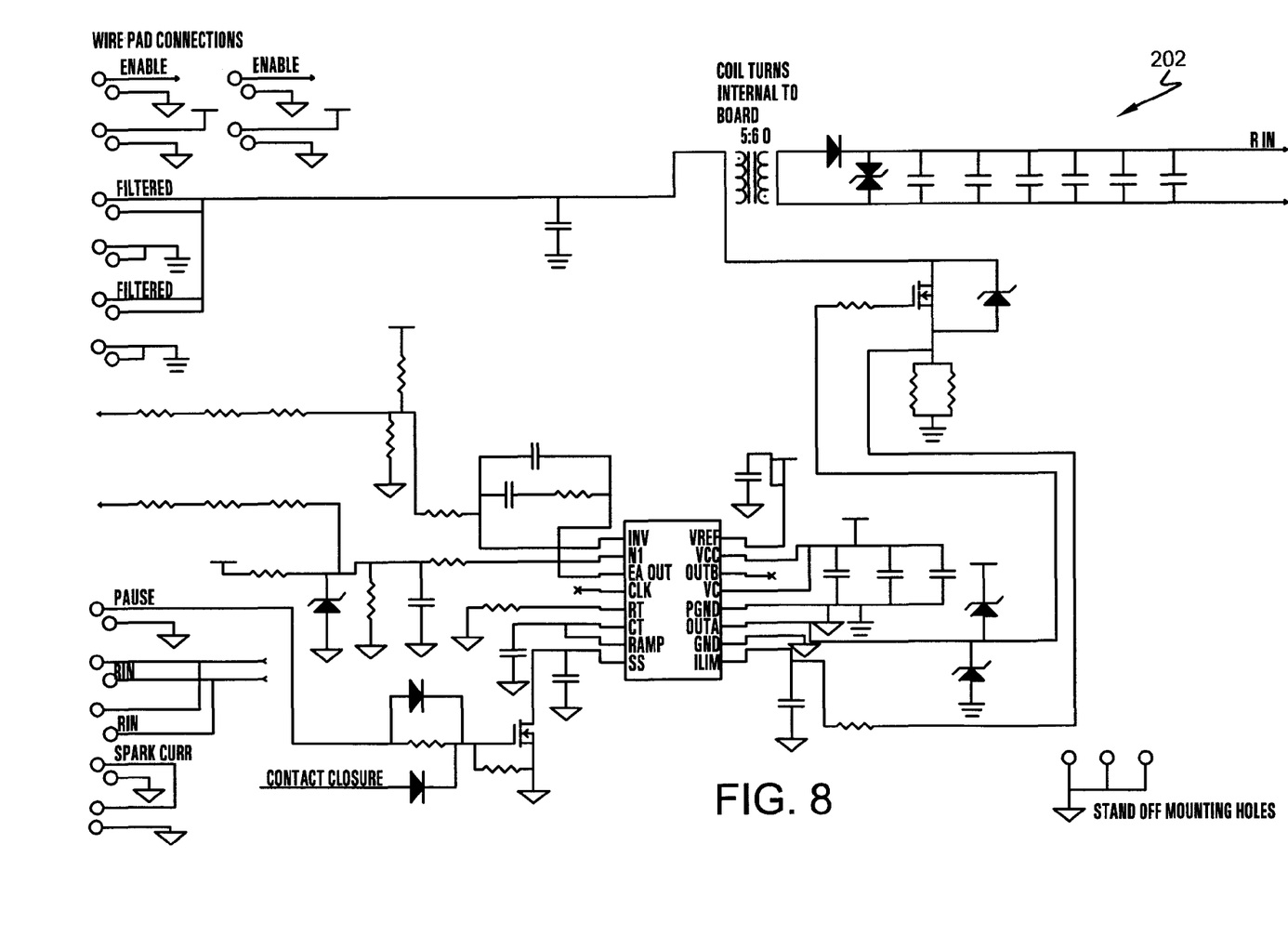
FIG. 8 illustrates the DC-DC power board schematic of the exciter-igniter in accordance with the disclosed architecture.

FIG. 8 illustrates the DC-DC converter board 202 schematic. The converter board is the second board in the electronics assembly stack. This board generates the bulk energy storage voltage, which delivers the majority of the energy to the gap. It receives signals from the input connector board, and forwards those that are appropriate to the HV exciter board. A custom designed planar main power transformer is integrated into the board design.

Figure 9:
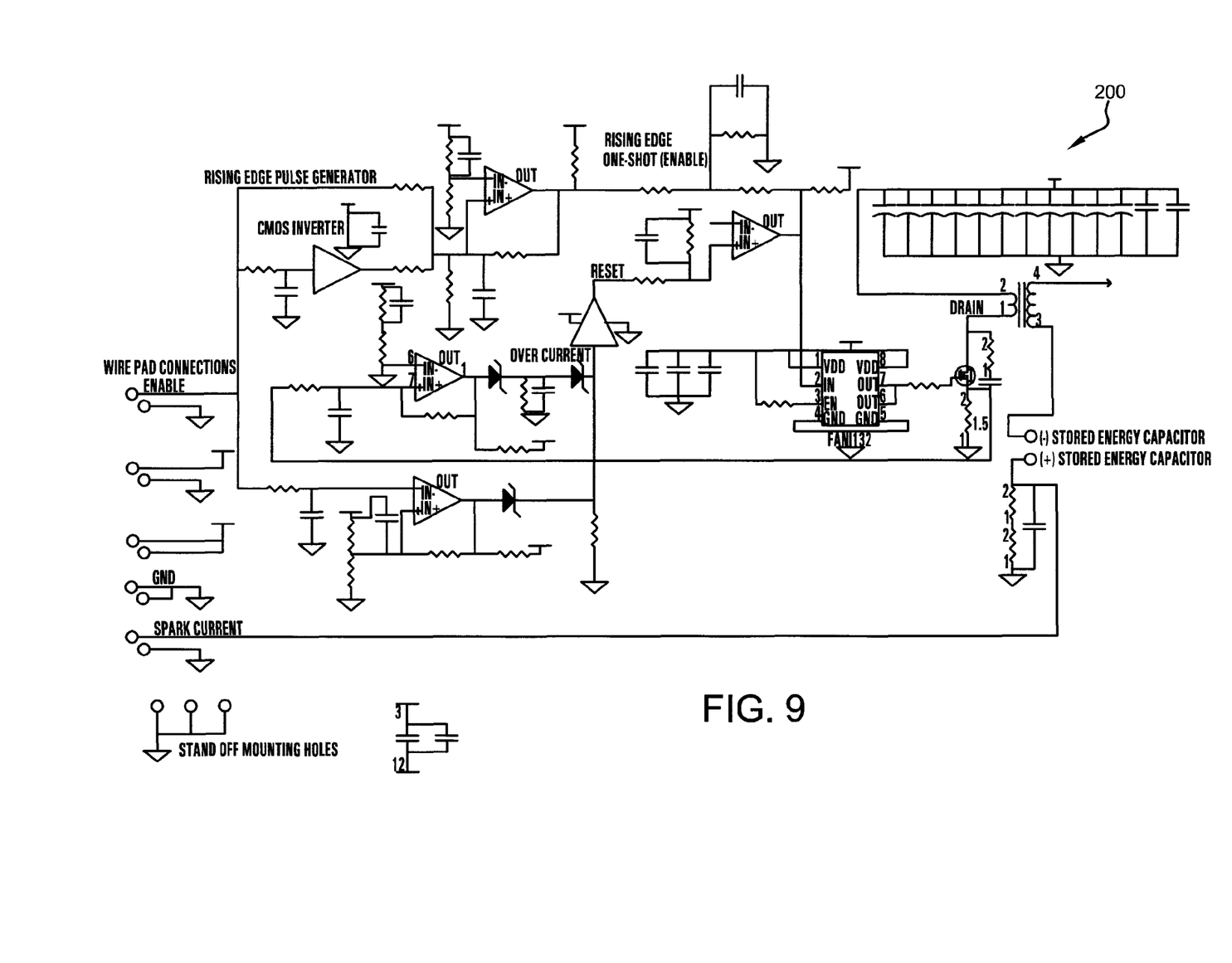
FIG. 9 illustrates the HV exciter board schematic of the exciter-igniter in accordance with the disclosed architecture.

FIG. 9 illustrates the HV exciter board 200 schematic. The exciter board is the third and final board in the electronics assembly stack. It generates the high voltage spark, sends a scaled signal of the spark current to the input connector board, provides a mounting location for the ignition coil, and most importantly eliminates the need for a high voltage cable by interconnecting the igniter and the coil.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An integrated exciter-igniter unit comprising:
   a housing comprising an exciter electronics assembly;
   an igniter directly mounted to an end of the housing; and
   an ignition coil contained within the housing and which directly interfaces with the igniter; and
   wherein the exciter electronics assembly comprises an input connector board, a DC-DC converter board, and an HV exciter board; and
   wherein the HV exciter board provides a mounting location for the ignition coil and eliminates need for a high voltage cable by interconnecting the igniter and the ignition coil; and
   a high voltage pin interfaces the igniter to the HV exciter board and the ignition coil.

2. The integrated exciter-igniter unit of claim 1, wherein the housing is a hermetically sealed stainless steel enclosure.

3. The integrated exciter-igniter unit of claim 1, wherein the unit transforms a DC input voltage into a high-voltage, high-energy pulse train for igniting a propellant.

4. The integrated exciter-igniter unit of claim 3, wherein the unit mates to an external electrical system via a hermetic connector.

5. The integrated exciter-igniter unit of claim 4, wherein the igniter comprises a spark plug and a tip.

6. The integrated exciter-igniter unit of claim 5, wherein the tip is comprised of a high temperature alloy.

7. The integrated exciter-igniter unit of claim 1, wherein the input connector board provides an interface between the hermetic connector and the exciter electronics assembly.

8. The integrated exciter-igniter unit of claim 7, wherein the input connector board generates timing signals.

9. The integrated exciter-igniter unit of claim 8, wherein the DC-DC converter board regulates energy storage voltage, which is responsible for delivering a bulk of a spark energy pulse.

10. The integrated exciter-igniter unit of claim 9, wherein the HV exciter board is positioned at bottom of the exciter electronics assembly.

11. The integrated exciter-igniter unit of claim 10, wherein the HV exciter board generates a high voltage spark and sends a scaled signal of spark current to the input connector board.

12. A flight-like, exciter-igniter unit comprising:
    a hermetically sealed housing comprising an exciter electronics assembly and an ignition coil enclosed within the housing; and
    an igniter directly mounted to an end of the housing,
    wherein the ignition coil directly interfaces with the igniter; and
    wherein the exciter electronics assembly comprises an input connector board, a DC-DC converter board, and an HV exciter board; and
    wherein the HV exciter board provides a mounting location for the ignition coil and eliminates need for a high voltage cable by interconnecting the igniter and the ignition coil; and
    a high voltage pin interfaces the igniter to the HV exciter board and the ignition coil.

13. The flight-like, exciter-igniter unit of claim 12, wherein the unit mates to an external electrical system via a hermetic connector.

14. The flight-like, exciter-igniter unit of claim 12, wherein the igniter comprises a spark plug and a tip.

15. An exciter-igniter, comprising:
    an enclosure comprising an input connector board, a DC-DC converter board, and an HV exciter board;
    an igniter directly mounted to an end of the enclosure; and
    an ignition coil housed within the enclosure and which directly interfaces to the igniter via the HV exciter board; and
    wherein the HV exciter board provides a mounting location for the ignition coil and eliminates need for a high voltage cable by interconnecting the igniter and the ignition coil; and
    a high voltage pin interfaces the igniter to the HV exciter board and the ignition coil.

\* \* \* \* \*